United States Patent [19]  [11]  4,118,453
Herrington  [45]  Oct. 3, 1978

[54] METHOD AND APPARATUS FOR THE EXTRUSION OF TUBULAR THERMOPLASTIC FILM

[75] Inventor: F. John Herrington, Holcomb, N.Y.

[73] Assignee: Mobil Oil Corporation, New York, N.Y.

[21] Appl. No.: 718,692

[22] Filed: Aug. 30, 1976

[51] Int. Cl.² .............................................. B29D 23/04
[52] U.S. Cl. ......................................... 264/89; 264/95;
264/209; 264/237; 425/72 R; 425/326.1; 425/387.1
[58] Field of Search ............... 264/89, 95, 209, 290 R, 264/237; 425/72, 326 R, 387 R, 326.1, 387.1, 72

[56] References Cited
U.S. PATENT DOCUMENTS

| 3,210,803 | 10/1965 | Najar | 425/72 |
|---|---|---|---|
| 3,548,042 | 12/1970 | Hinrichs | 264/95 |
| 3,551,540 | 12/1970 | Pellicciari et al. | 264/95 |
| 3,835,209 | 9/1974 | Karabedian | 264/237 |
| 3,867,083 | 2/1975 | Herrington | 264/95 |
| 4,022,558 | 5/1977 | Herrington | 264/95 |

FOREIGN PATENT DOCUMENTS 1,123,318 8/1968 United Kingdom ...................... 264/95

Primary Examiner—Jeffery R. Thurlow
Attorney, Agent, or Firm—Charles A. Huggett; Carl D. Farnsworth

[57] ABSTRACT

The present invention relates to a method and apparatus for the extrusion of tubular thermoplastic film which comprises extruding a melt of thermoplastic through an annular orifice to form a bubble or expanding cone terminating in a tube and while the expanding cone is still in a semi-molten condition, passing it through a prearranged cooling and shaping means comprising a plurality of air dispensing rings shaped in congruence with desired form of the expanding cone or film. Each air ring provides two converging or parallel air streams, each of which expands from the effluent port. The method and apparatus permits increased production speeds and minimized gauge variation in the expanded film.

4 Claims, 3 Drawing Figures

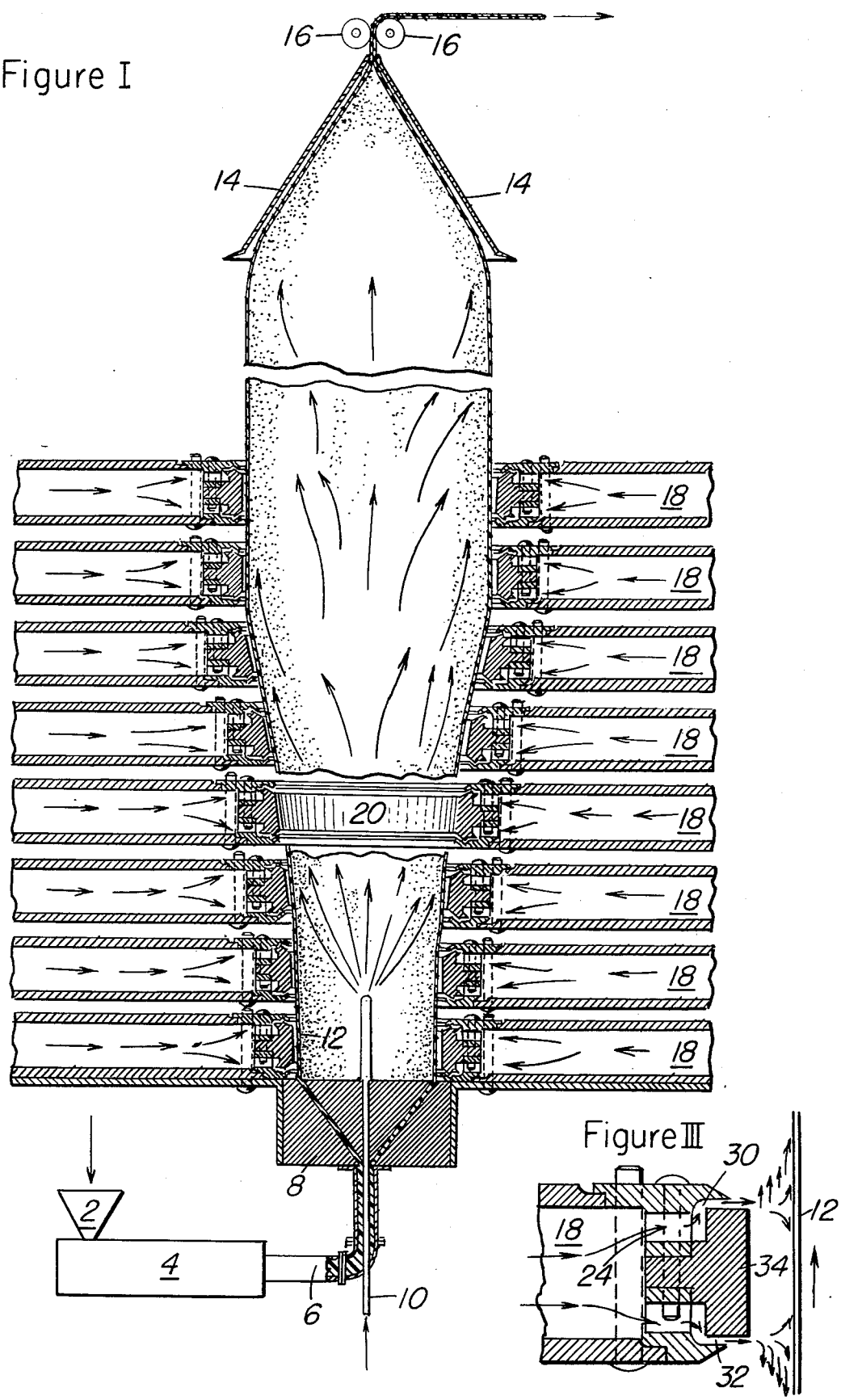

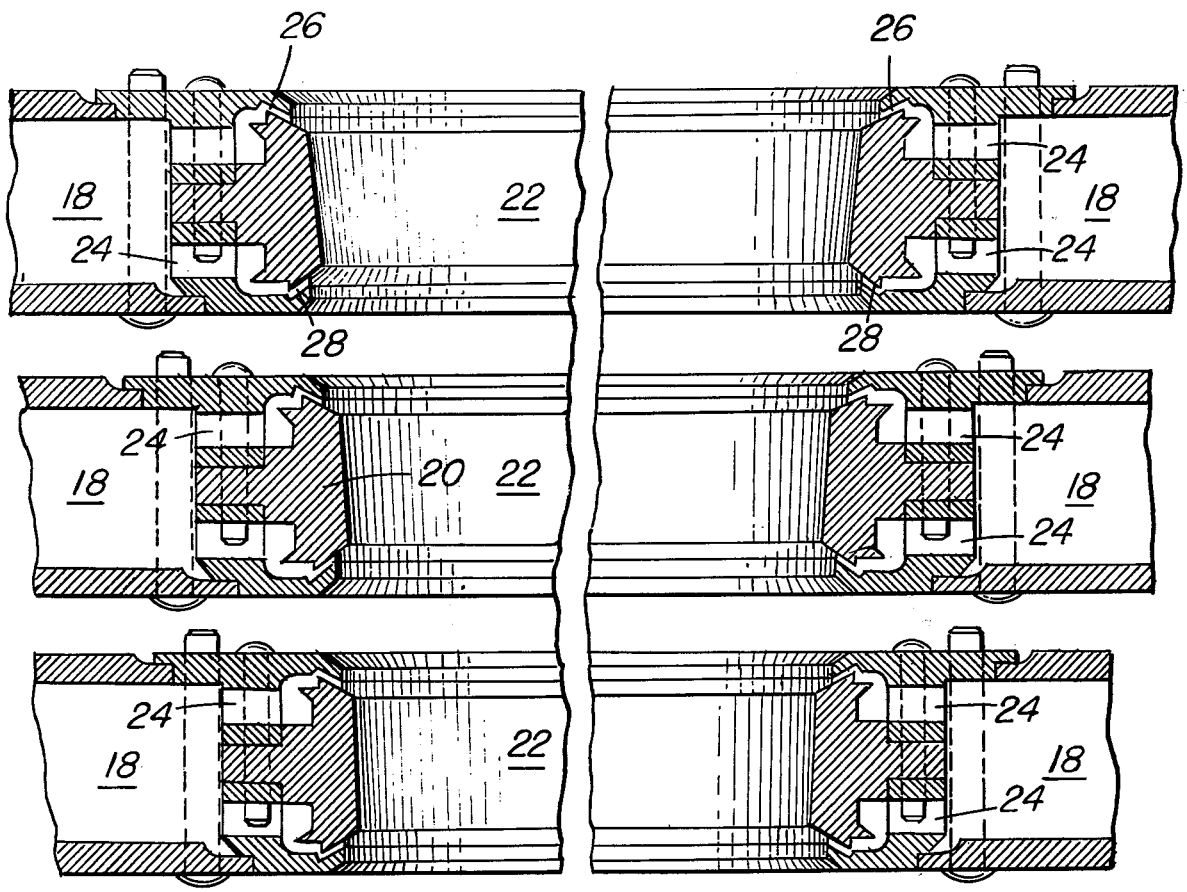
Figure II

METHOD AND APPARATUS FOR THE EXTRUSION OF TUBULAR THERMOPLASTIC FILM

BACKGROUND OF THE INVENTION

1. Field of the Invention

The present invention relates to an apparatus and method for producing blown tubular films from thermoplastic materials. More particularly, this invention relates to improved tube forming and cooling procedures wherein a blown tube is expanded in a prearranged conical restriction and formed by differential air pressure flow produced by cooling air of appropriate pressure directed toward the external surfaces of the advancing tube as it is being formed.

2. Description of the Prior Art

Generally, the prior art technique for forming tubular thermoplastic films comprises continuously extruding a melt of a thermoplastic material through an annular orifice, applying internal fluid pressure to the semi-fluid tube thus extruded and shape expanding the tube to reduce its wall thickness to appropriate dimensions while cooling and solidifying the extruded thermoplastic. Thereafter, the formed tubing is recovered as by passing it over cooling rollers and/or a part of counter-rotating pinch rolls. The flattened tubing may be subsequently passed to a roll forming or wind up turret or directly to further processing as a bag-making operation.

Although useful thermoplastic film tubing has been commercially prepared, under certain circumstances, such a product may have an undesirable gauge non-uniformits, i.e., the thickness of the film is not uniform. Furthermore, the film is not uniformly stressed in a linear and radial direction. Such non-uniform wall thickness results in, for a given average thickness, low gauge points which introduce weak areas in the film. Also, gauge variation results in an uneven, humped roll of film upon winding of the flattened tubing. In addition to the unsightly appearance of such rolls, when the film on such rolls is unwound, it does not lie flat and thus requires special precautions in the printing, conversion and other uses thereof.

One of the major problems in this art is to control cool and control expand the extruded bubble of thermoplastic material at high rates of production. Production rate for any given tube (bubble) size is limited by the character of the bubble being extruded. Thus, under a given set of operating conditions, increasing extruder output will cause the thermoplastic to be formed into the tube at a higher rate but since the heat exchange character of the system will not have changed, it will also cause a rise in the height of the bubble frost line (that is, the line where the extruded and expanding bubble or tube turns from a molten to solid character). This in turn causes an increase in the instability of the extruded bubble because its unsupported molten length has become too long. Supporting the expanding film bubble through a controlled cooling zone in general permits increased extrusion speeds.

The shape of the bubble of cooling thermoplastic film is an important factor in the effect on the final film of variations in the annular die. As might be expected, it is practically impossible to manufacture and maintain a die of exactly uniform width of die gap throughout the circumference thereof. Some adjustment is possible by movement of the inner and outer die faces relative to each other but precision machining of such precise nature as to eliminate significant variation around the die is not now achievable in commercially practicable operations. The variations in gauge as extruded are exaggerated as the bubble of molten film expands and cools.

In the "neck" of the bubble adjacent the extruder die, the resin is molten and hence of low tensile strength. Portions which are of low gauge because of die conformation will be stretched in the neck region to a greater extent than portions of higher gauge, thus increasing the difference in gauge and imparting a different degree of orientation to different areas of the film being formed. This effect increases the gauge variation imposed by the die.

As the film advances in the expanding bubble, it cools and becomes more viscous and stronger as it approaches and passes through the solidification temperature. It will be readily understood that thinner areas cool more rapidly than areas of greater gauge and hence achieve a higher tensile strength. Expansion of the bubble at this stage will cause greater stretch of the thicker portions of higher temperature and thus reduce gauge of these thicker portions to a greater degree than the reduction of the gauge of thinner portions. This effect tends to compensate for inequalities of gauge but can overcompensate to a degree such that the gauge inequalities are reversed and the problem is not really solved.

It has been found that the bubble can be formed and cooled under controlled conditions to exploit the effects described above by causing expansion of the bubble according to a pattern such that differences in tensile strength are caused to act for minimizing of gauge differences resulting from inequalities of the die. This is achieved by imposing on the bubble a shape such that differentials in attenuation of film in the bubble will act at a region of the bubble and to a controlled extent such that gauge variations at the die are compensated but not overcompensated. The bubble shape to achieve this result will vary with nature of the resin, draw down ratio of final film thickness to die gap, rate of production and other process variables.

A system for controlled shape imposition and controlled cooling is described in my prior patents typified by U.S. Pat. No. 3,867,083, dated Feb. 8, 1975. That system provides a plurality of shape imposing cooling rings arranged to provide an inner contour corresponding to desired shape of the bubble. At each ring, two streams of cooling gas, such as air, are ejected to diverge from each other and flow against the bubble of film between such and a face of the cooling ring parallel to the film. The Bernoulli effect causes a vacuum to be created in the space of increased gas velocity between the ring face and the film, thus causing the film to follow the contour of the stack of cooling rings.

That such system of shape imposition and controlled cooling is effective for the purpose has been established by operation on high speed extrusion lines producing film of improved properties. Although the technique is very effective, it has been found that scans of the gauge variation across the film vary from scan to scan in a manner to indicate that, although gauge uniformity has been improved over previous practice, it is still subject to further perfection. It is now proposed that the variation from scan to scan arises from flutter of the film adjacent the faces of the shape imposing rings. While not wishing to be bound by any theory, it is postulated that, as film moves closer to the ring face under influence of reduced pressure due to Bernoulli effect, the space between film and ring face is reduced enhancing the Bernoulli effect and further reducing pressure (increased vacuum) tending to draw the film even closer until flow of air is drastically curtailed, thus building up pressure at the air outlet and forcing film away from the ring face at the point of increased pressure. Film which has approached the face under reduced pressure is then whipped away by the bulge near the air outlet and the cycle repeats. The resultant "flutter" would possibly explain the scan-to-scan variation. Whatever the proper explanation may be, that variation is eliminated while retaining advantages of the vacuum system, by novel means and methods described hereinafter.

SUMMARY OF THE INVENTION

Improvement in operation of the shape imposing air rings, together with other objects and advantages are achieved by redesign of the cooling ring faces and air orifices such that pressured air is supplied as annular streams concentric with the film bubble and congruent with the desired bubble shape; varied however in that the two air streams at a given ring are parallel or converging and in that velocity of the air stream is reduced as it passes between the film and surfaces of the inner face of the shape imposing cooling ring.

The effect achieved by the present method and apparatus is to position the film adjacent each successive ring by the opposing forces of pressure inside the bubble from air introduced through the core of the extrusion die and pressure external to the bubble imposed by air from the shape imposing rings.

The present invention is directed therefor, to a method and apparatus which substantially further reduces prior art difficulties in the production of a thermoplastic film tube at higher rates of speed than previously possible. A method and apparatus is provided for the extrusion of relatively thin film tubes at high rates comprising the steps of passing a molten thermoplastic resin through an annular die or orifice to form a tube thereof, effecting a controlled expansion by inflating the tube with air in a prearranged restricted expansion section during cooling the inflated tube to solidify the molten thermoplastic. The tube is cooled by passing it through a prearranged restricted and shaped opening such as a cylindrical or conical opening formed by a plurality of superposed separate stacked air chambers forming an axially aligned and concentric circular opening within the stacked chambers. The circular opening in each chamber provides a surface of limited thickness which is supplied with pressured air under selected impingement conditions against the film tube passing through the concentric circular opening of the stacked chambers. The stacked air chambers are separated from one another to form a space for egress of introduced pressured air imposed on the film surface passing through the circular opening.

Each of said air chambers is provided with a central ring element of restricted thickness and particularly provided with a pair of cooling air directing slots or apertures. Those slots or apertures are shaped such that air issuing from the pair will be directed in parallel or convergent paths of expanding dimensions. The ring element is detachably secured to the cooling air distributing chamber. Air is supplied to the cooling air plenum chambers from separate inlet conduits means associated with each chamber. The inlet conduits are located so that when two or more separate chambers are superposed upon one another, the individual inlet conduits form common aligned channel means between chambers which carries air at a predetermined pressure from an outside source of supply to the respective plenum chambers and associated air distribution rings. The air inlet conduits provided for each plenum chamber are circular, elliptical or other suitable shape and are characterized by having a raised alignment boss on their upper and lower peripheries to maintain adjacent plenum chambers in space-apart aligned relationship. The spacing is provided to particularly permit the egress of air impinged against the tubing to escape from the system.

BRIEF DESCRIPTION OF THE DRAWINGS

FIG. I is a sectional view in elevation of a tubular film expansion restricting extrusion apparatus embodying features of the present invention.

FIG. II is an enlarged cross sectional view of preferred air dispensing ring surface means used with the air distributor chambers chown in FIG. I.

FIG. III is a cross-sectional view of another air dispensing ring surface means which may be used with the air distributing chamber.

DESCRIPTION OF SPECIFIC EMBODIMENTS

Inherent in all extrusion dies there is some degree of variation in the thickness of molten film exiting around the periphery of the die orifice. This is caused by not achieving an absolutely uniform orifice between adjacent die lips.

In some prior art processes the thickness error encountered in the molten or semi-molten tube leaving the die normally results in a thickness error, i.e., gauge variation, in the final film. The relationship of film gauge profile to die error is a complex function of cooling rates and viscosities in the molten film as it is being stretched and cooled. It has been found that the imposition of a particular shape on the extruded molten film to form an expanding bubble permits some considerable control on these various factors of film thickness and stress uniformity so that they inter-react in such a way as to substantially cancel out and/or minimize gauge errors introduced by virtue of the aforedescribed extrusion die nonuniformity.

It has been found, for example, that if the bubble is caused to immediately expand or blow-up to its enlarged diameter close to the die, there will be a direct relationship between the die irregularities and the irregularities in the resultant film thickness; that is, where the molten film leaving the die is thickest, the final film will be thickest and vice-versa. Conversely, if the point of maximum film blow-up is moved further from the die there will be an inverse relationship, i.e., a thin area leaving the die will cool more rapidly than the thicker film yet to be cooled and will often result as the thickest area in the final film product. By choosing more selective prearranged shape forming conditions and film cooling, it is possible to effect a substantial cancellation of the above undesired factors.

In known processes prior to that of U.S. Pat. No. 3,867,083, a selective control on film thickness and stress characteristics is not readily achievable, if at all, whereas practice of the present invention provides substantial control factors at increased production rates as described herein.

The present method and apparatus contemplates using a rotating screw, extruder means comprising an annular extrusion die means and an internal air, or other fluid, introduction means axially mounted in the annular die. The apparatus includes pinch roller means spaced apart from the annular die a sufficient distance so that the film tube eventually passing therethrough is sufficiently cooled to be substantially solid and non-tacky. The apparatus also includes means to provide sufficient air or other fluid medium inside the extruded film bubble to exceed the ambient atmospheric pressure and cause the extrudate to form the intended prearranged bubble configuration against pressure exerted by the shape imposing air rings.

The method and apparatus of this invention is directed to the use of predetermined shape selected means for imposing a particular configuration on an extruded film tube of thermoplastic material from the time it issues from the annular extrusion die in a semi-molten condition to the time, downstream thereof, at which it attains a freeze point and is more in the solid, substantially non-plastic state.

The predetermined shape or configuration imposing means comprises a housing of substantially any generally diverging shape terminating in a cyclindrical or diverging conical shape of film tube. It is not intended by the characterization of the expanding housing imposing means that such be limited to an exact geometric reproduction of such mathematical functions as have been mentioned. Rather these are given as illustrative of the general type of configuration which is useful in the invention. It has been found most useful to use a housing generally diverging from the extrusion die to a more downstream position concentric with the annular extrusion die wherein the film is in a substantially solid state. The degree of divergence is related to film speed therethrough sufficient to coordinate film stresses in both lateral and linear direction.

The housing referred to above is generally conical and sized to restrict the rate and extent of film expansion. The housing comprises a plurality of stacked air chambers sized to form said housing each terminating in an aperture with cooling air channels on the surface thereof as shown in the drawings and directed toward the extruded film tubing.

Means are provided for forcing air or some other appropriate cooling fluid from each chamber through the channels provided and toward the extruded thermoplastic tubing. Escape aperture means are also provided between pairs of the air chambers for the air or other introduced fluid to escape. Thus, a circulatory system is provided for forcing a cooling fluid from the housing means towards the extruded tube, passing the cooling fluid along the extruded tube and then providing for egress of the introduced cooling fluid. Where the fluid is air, the atmosphere can be suitable reservoir to pump from and to. If another fluid is used, a suitable reservoir and closed system can be provided.

The segments of introduced cooling fluid are sufficient to cool the extruded film tubing and solidify it to an extent sufficient to render it non-tacky and dimensionally stable. In the absence of any configuration imposing housing, the extruded semi-fluid thermoplastic material will freely expand as a function of the pressure applied by an internal fluid, its inherent cooling rate function and the inherent strength of the liquid thermoplastic material used. The apparatus and method of this invention goes far beyond haphazard expansion and non-selective cooling of extruded film by imposing a controlled expansion of the film in a cooling atmosphere to form an extruded tube of desired size and stress orientation. Thus, the film is stress oriented laterally as well as longitudinally in the controlled cooling atmosphere. If the temperature and flow rate of the external cooling fluid are adjusted in consideration of the particular thermoplastic material being extruded and the dimensions of the extruded tube finally recovered from the annular extrusion die, then the frost line of the extruded tubing can be positioned within the configuration imposition means and generally toward the downstream end thereof.

It should be clear from the discussion herein presented that many of the processing variables are interdependent and are not necessarily independently definable. One purpose of this invention is to improve the rate and shape of expansion upon an extruded tube of thermoplastic film material while control cooling the extruded molten tube to a dimensionally stable stress relieved and non-tacky condition, with improved stability of the process to further reduce gauge variation along both length and width of the blown film.

It has been found particularly desirable to form relatively adjacent fluid dispensing annular channels in each detachable ring means mounted on the inner periphery of the air carrying plenum chamber and adjacent the advancing thermoplastic tubing. The detachable mounting of the configuration imposing ring facilitates ring removal for ease of cleaning. The fluid dispensing apertures may become clogged with foreign materials during use. Additionally, since most of the intricate machining of the individual air distributing rings is done on this portion of the ring, the cost is minimized by minimizing the size of the piece being machined.

The thermoplastic material extruded into a tube according to this invention may be polyolefin such as polyethylene, polypropylene, polybutene-1, copolymers of two or more of these with or without other olefins, polyvinyl or vinylidene chloride, vinyl or vinylide chloride copolymers with acrylates, acrylonitrile, olefins and the like, acrylic homo and/or copolymers, styrene homo and/or copolymers, and in general, such other polymeric materials as are conventionally melt extruded into film form.

The thermoplastic is usually extruded through an annular die having a diameter of about 0.5 to 50 inches and a die gap of about 0.010 to 0.100 inch. Conventional air ring cooling processes may operate with a given combination of die orifice, blow-up ratio (ratio of bubble diameter to die diameter), extruder output and haul-off speed in order to produce a film of a given thickness. Those criteria apply also to the process of this invention.

Extrusion rates are, of course dependent upon the extruder used. However, flow rates of about 2 to 25, preferably 4 to 20, pounds per hour per inch of final bubble circumference can be easily maintained within the parameters of the practice of this invention. Blow-up ratios, that is, the ratio of final film diameter to die diameter, on the order of about 1.0 to 5 are suitable as are final film thickness of about 0.4 to 10 mils. The preferred internal pressurizing fluid and external cooling fluids are air, however, other similarly acting relatively inert gases can be used. The internal fluid is maintained at a pressure above atmospheric for expansion of the extrudate. The external fluid should be maintained at a temperature of about 0° to 200° F. and be fed at a rate of about 75 to 600 SCFM per square foot of surface area of the molten tubing being cooled. It is within the scope of this invention to provide means within the island portion of the extrusion die means to extract some or all of the air injected into the extruded tube so as to form a flowing system of air.

The method and apparatus of this invention comprise imposition of shape and cooling upon extruded semi-molten film. The film is drawn outward and adjacent to the ring forming configuration by a combination of internal air pressure and air pressure imposed in the external surface of the film. It is possible to push the film against the shape forming rings with internal air pressure but this is undesirable. The ring confining housing must not be touched and this is accomplished by a appropriate selection of internal and external air pressures. For example, the external cooling air is directed by slot means against the film under conditions of velocity which repel the film from the ring surface sufficiently to overcome tendency of internal pressure to press the film against the ring surface but inadequately for severe displacement inwardly against internal pressure. The method and apparatus of this invention and particularly the ring configuration is concerned with reducing film flutters at high film speeds.

Some known methods of imposing shape on the bubble exert a frictional drag on the molten film, making it necessary to use a larger die orifice gap in order to prevent the molten film from becoming slack near the die, such slackness being a cause of film folding over on itself and hanging up. With the present invention, the molten film is completely isolated from the cooling rings, thus permitting selection of die orifice gap without restraints imposed by behavior adjacent the cooling rings.

The film is forced outward by gas pressure within the bubble into close proximity with cooling ring configuration. Because of the air flow patterns created by the rings, the film is prevented from touching the rings. The aerodynamic forces are thus such that the film is positioned with stability. The closer the film moves to the inside surface of the ring, the greater is the repelling pressure that is exerted on the film by the flowing air.

The dynamic balance so achieved results in the film assuming movement in a path which remains constant so long as process variables remain undisturbed, namely rate of extrusion, pressure in the bubble and velocity of air flow from the several air rings constituting the shape imposing assembly. Of particular advantage is a preferred form of the invention in which each air ring is formed with a flat inner surface parallel to the desired bubble configuration and having convergent air inlets at opposite edges of that surface to provide a substantial air in which pressure builds up to provide repellant force as film approaches the cooling ring.

In the preferred configuration, air leaving slots on either side of the inner flat surface tends to flow in both directions along the film from the slot. However, flow toward the opposing slot is opposed by tendency of flow from that opposing slot, resulting in a static pressure over the flat surface between the slots generated by the opposing tendencies to flow.

Referring now to FIG. I there is shown diagrammatically in elevation a cross-sectional view of an arrangement of stacked air chamber with internal ring assemblies arranged to form a restricted cooling zone of diverging shape through which a blown film of thermoplastic material is caused to pass. A thermoplastic resin suitable for forming a film is fed to an extruder 4 by hopper means 2. In extruder 4, the resin is heated to a semifluid condition and passed by conduit 6 to annular orifice die means 8. Conduit 10 supplies air or other cooling fluid at a desired pressure to the inside of the tube of extruder film 12. The extruded film 12 moves through the diverging cooling section adjacent to the shape restricting ring surfaces as hereindiscussed during cooling of the film to a non-tacky solid condition. The solidified tube is collapsed by guides 14 before passing through nip rollers 16. The flattened tube is then processed as desired in downstream equipment.

In the arrangement of FIG. I the plurality of air chambers 18 are each provided with ring members 20 provided with adjacent air impinging slot means more clearly shown in FIGS. II and III later discussed. The ring members are coaxially aligned as shown in the drawing and surface inclined to provide the diverging shape particularly desired when the air distributor chambers are spaced apart a predetermined and desired amount for desired air flow therebetween. The particulars of the shaped ring air distributor means of FIG. I are more clearly shown in FIGS. II and III. Referring now to FIG. II there is shown three ring sections with air distributor chambers of FIG. I in substantially vertical and coaxial alignments. The internal ring surface 22 is maintained at an angle to provide the smooth divergence required in the combination of stacked rings. Air passage 24 is provided between air chamber 18 and air impinging slot means 26 and 28 particularly identified with the upper ring assembly. In the arrangement of FIG. II, the upper annular slot 26 is directed downwardly at an angle of about 30° from the horizontal and lower slot is directed upwardly at an angle of about 30° from the horizontal. Thus in each of the ring segments of FIG. I, it is shown and contemplated using sloping annular ring air impinging slots as above discussed.

FIG. III on the other hand shows a cross-sectional view of the ring means wherein the air is caused to flow through substantially horizontal annular slots 30 and 32 against film 12. In this embodiment the ring surface may be substantially vertical as shown or it may be sloped in a manner similar to that shown in FIGS. I and II.

In the arrangements of FIGS. I, II and III, it will be observed that the surface of the ring extends beyond the boundaries of the air impinging slots 26, 28, 30 and 32. For example, in the arrangement of FIG. III, the impinging air introduced by slot 30 as a jet of air strikes the film as shown in the drawing and tends to splash both upward and downward as the film 12 moves in an upward direction. However, downward flow of impinged air is opposed by air introduced by the lower slot 32. Therefore all of the air is caused to flow away from the ring surface segment 34, that is upward from the top slot means. By this action, a pressure is created in the space between film 12 and surface 34 by an amount necessary to deflect the entire air stream upward. As the gap becomes smaller the pressure becomes higher because there is less area on which to exert the deflecting force on the air stream. This combination of ring design with inwardly sloped and horizontal impinging slots with set back on the outside surface of the slot has been effective in reducing film flutters significantly at higher film speeds through the restricted cooling section.

It will be noted that the surfaces adjacent slots 26 and 28 in FIG. II and slots 30 and 32 in FIG. III are so formed that air issuing from the slots passes through spaces of increasing volume as it flows to exit spaces between adjacent rings. The resultant expansion and reduced velocity assure that no vacuum effect will be caused. The only aerodynamic effects are those of a confined pressure zone between the slots and pressure of flowing streams against the film.

Having thus generally described the invention and disclosed specific embodiments going to the very essence thereof, it is to be understood that no undue restrictions are to be imposed by reason thereof except as defined by the following claims.

I claim:

1. In a process for the production of thermoplastic film by melting a thermoplastic material, extruding the molten thermoplastic material through an annular die to form an extruded tube of molten material, cooling the extruded tube while drawing the tube so cooled, expanding the tube to attenuate the walls thereof by introducing a gas to the interior of the tube, and flowing a cooling gas in contact with the outer surface of said tube from a plurality of circular pairs of annular zones about said extruded tube spaced along the axis thereof and being of increasing diameter in the direction away from the point of extrusion as aforesaid; the improvement whereby flutter of the expanding film tube is reduced during expanded cooling thereof which comprises directing separate pairs of cooling gas confined streams against said film on each side of a shape restricting surface which extends beyond the discharge boundaries of the discharged confined streams, said cooling gas passed in contact with the outer surface of said film tube at each of said shape restricting surfaces to produce a positive gas pressure zone between said surface and said film material and withdrawing said cooling gas from such contact between each pair of adjacent cooling gas inlets.

2. In a process for blowing thermoplastic film by injection of air within an extruded moving tube of molten thermoplastic resin while cooling and imposing expanding shape on the bubble of film resulting from expansion of the tube and attenuation of film thickness by reason of said air injection; such imposition of shape being accomplished by a plurality of stacked surface restricting rings, blowing air from air sources on each side of said surface restricting rings against the exterior of said film surface, said air sources being concentric with said expanding film and arranged at generally increasing distance from the center line of the bubble in the direction of movement of the film such that the contour of said air sources corresponds to the desired shape of said expanded film from a point adjacent the source of said extruded tube to a point adjacent the film tube cooled to substantially stable dimensions; the improvement which comprises arranging said concentric air sources in pairs of which the cooling air flow from the members of a pair are on each side of a film restricting surface with space between adjacent pairs provided for discharge of air so introduced, the film restricting surface extending beyond the discharge boundaries of air sources, and discharged air from said such sources being expanded as it passes against said film to produce a positive pressure zone between said air sources, said film restricting surface and said film.

3. In apparatus for the production of blow plastic material comprising an annular die, means to supply molten thermoplastic material to said die under pressure to force said material through said die and thereby generate a moving tube of said material, means to introduce a gas under pressure within said moving tube to expand said tube to a bubble of film and attenuate the walls thereof, a series of cooling and shape imposing ring surfaces about said bubble of film concentric therewith and of increasing diameter in the direction of movement of said tube of material from adjacent said die to adjacent a downstream point of said expanded bubble at which said material has cooled to a film state of substantial dimensional stability; the improvement which comprises providing cooling gas annular outlet slots each side of said rings formed to present a flat annular restricting surface for the expanding bubble of film, walls defining a plenum chamber about said annular restricting surface for supplying cooling gas to said annular outlet slots, said flat ring surface extending slightly beyond the discharge boundary of said annular slots, flowing cooling gas through said annular slots each side of said flat restricting surface sufficient to maintain a zone of cooling gas between said flat surface and said film under positive pressure conditions and collecting and withdrawing cooling gas so introduced between rings arranged as above provided.

4. Apparatus according to claim 3 wherein the said rings are spaced from one another to permit expansion of air flowing from said annular slots in a direction away from said flat annular surface and said film.

* * * * *